J. FLIEGEL.
APPARATUS FOR HEATING LIQUIDS, ESPECIALLY MILK.
APPLICATION FILED NOV. 9, 1909.
987,975.
Patented Mar. 28, 1911.
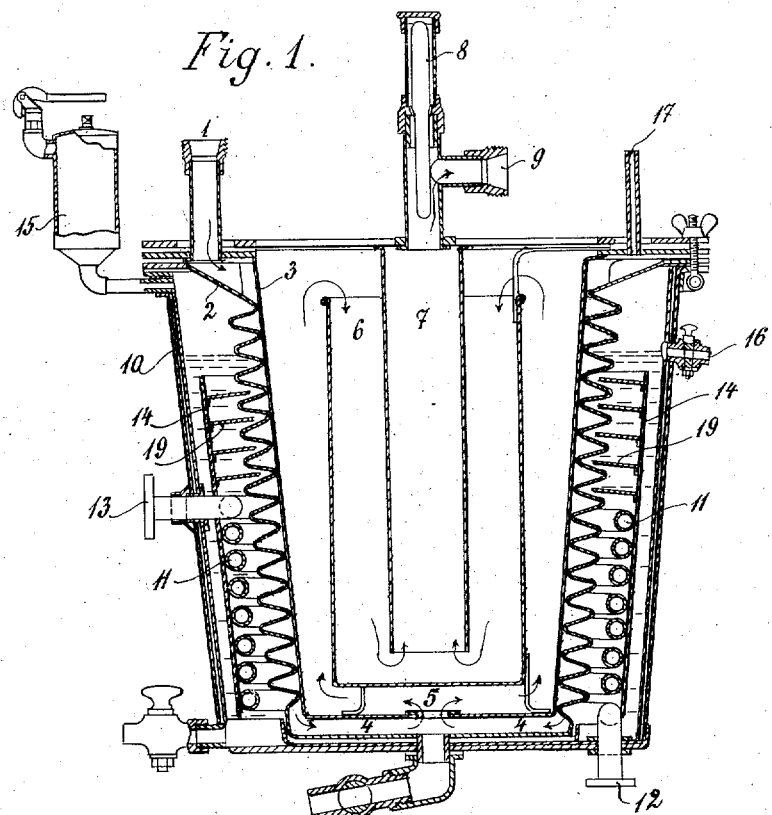
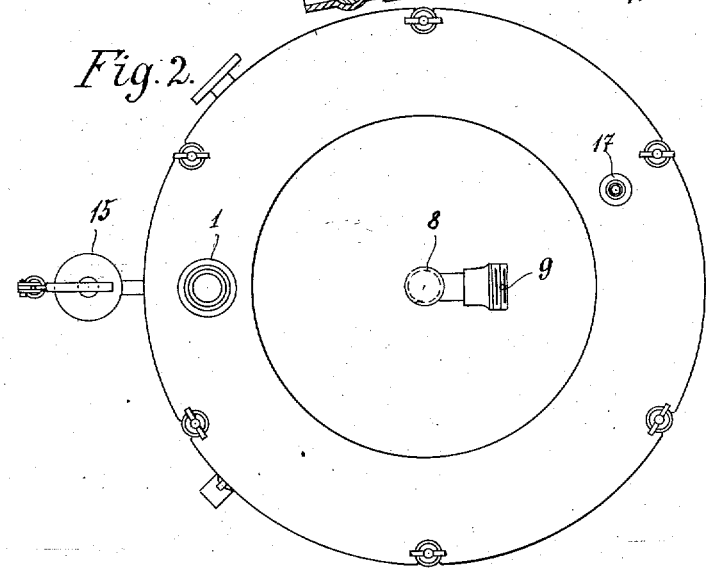
WITNESSES
W. P. Burke
A. F. Houman
INVENTOR
Josef Fliegel
ATTY.

UNITED STATES PATENT OFFICE.

JOSEF FLIEGEL, OF MALLMITZ, GERMANY, ASSIGNOR TO GEORG LINDERMANN, OF MALLMITZ, GERMANY.

APPARATUS FOR HEATING LIQUIDS, ESPECIALLY MILK.

987,975.   Specification of Letters Patent.   Patented Mar. 28, 1911.

Application filed November 9, 1909. Serial No. 527,078.

*To all whom it may concern:*

Be it known that I, JOSEF FLIEGEL, subject of the German Emperor, residing at Mallmitz, Germany, have invented new and useful Improvements in Apparatus for Heating Liquids, Especially Milk, of which the following is a specification.

This invention relates to an apparatus for heating liquids, especially milk, wherein the milk flowing down a helical-shaped heating body is subjected to the action of a heating medium flowing in an opposite direction.

The invention is based on the principle of heating by means of a water-bath heated by steam and has for its object to solve the problem of effecting the heating of the highly sensitive milk (to pasteurizing temperature) without agitator, the burning of the milk being prevented and also the admission of steam into the water. The steam remains apart and is prevented from directly heating the metal surface along which the milk trickles. Thus the steam merely heats the surrounding water. This water, however, is heated only in such a manner that it must circulate in itself and while rising in an opposite direction to the flow of the milk, it must deliver its heat to the latter, so that when in a boiling state, it can never exchange heat with the fresh incoming milk but always only at a temperature below 100° centigrade. In this manner, exactly the same favorable conditions exist as when boiling the milk in the water bath. The said conditions are complied with by the hereinafter described apparatus, which is mainly constructed in such a manner that a steam pipe is provided in the chamber at the lower part of a partition or casing, said chamber being filled with water and situated between the helical-shaped heating body and the outer wall, whereby the water, while being heated, moves constantly in an upward direction.

Referring to the accompanying drawing, Figure 1 is a vertical section through the heater and Fig. 2 is a plan thereof.

10 is the outer casing, which surrounds the various sections or compartments of the apparatus. The milk flows through the inlet 1 into the interior of the ribbed casing 2 in order to trickle along the helical-shaped path, which is formed by the attachment 3 extending to the ribs of the casing 2. When the milk has reached the bottom of the ribbed body 2, it flows through the lower inlet 5 of the attachment 3, rises therein in order to flow over the upper edge of the vessel 6 into the latter and then through the pipe 7 toward the outlet 9, whereupon it passes the thermometer 8. The vessel 3 is closed above so that a certain heat is stored up therein and also in the vessel 6.

The milk while flowing along the helical-shaped path formed between the casings 2 and 3 is solely heated by hot water. This water is contained in the chamber, which is formed by the casings 2 and 10. The chamber contains a helical pipe 11, in which steam enters at 12, which delivers its heat to the surrounding water and leaves the apparatus at 13. The heated rising water delivers the heat imparted to it immediately to the ribbed heating body 2. In order to extend the path of the rising water and to cause an intimate feed of the heated layers thereof into the helical-shaped chamber between the ribs of the heating body 2, the casing 14 is provided, which possesses internally a helical-shaped rib 19 made of sheet metal. These ribs compel the hot water to enter between the ribs of the casing 2. The casing 14 has moreover the function to promote the circulation of the water, in that the water, which becomes cooler above, is conducted below, where it is re-heated. The effect is also attained that above, at the point where the milk enters the ribbed body 2, the water is cooled to such an extent in consequence of the delivery of heat to the ribbed body that any formation of steam and any burning of the milk is prevented, whereas the heat of the water toward the bottom increases to the extent required for heating the milk.

In consequence of the heating of the water by steam and that of the milk by the heated water, a thorough heating of the milk is effected as in any boiler standing in the water-bath, and a burning of the milk is prevented owing to the previously mentioned cooling of the upper layers of water. The hygienic requirement is also complied with, according to which the milk shall be heated to a temperature not exceeding 70° centigrade and this temperature maintained for at least 5 minutes. For this purpose, the apparatus is of such diameter and height that it is adapted to receive in the interior of the casing 3 about as much milk as is permissible in five minutes by the efficiency of the apparatus with respect to the sectional area of the helical path in the ribbed body 2. Thus, at least 5 minutes must elapse, before the milk, which enters below at 5 into the collecting chamber, can pass out at 9.

15 is a safety valve, which is so adjusted that it blows off even at low steam pressure, whereby the attendant is made aware of the fact that less steam must be introduced.

16 is a water-gage cock, above which the surface of the water should not rise before the apparatus is rendered operative. In consequence of its own expansion due to the influence of heating, the water then rises of itself in order to fill up the chamber above the cock.

17 is a ventilating pipe, which is necessary, because otherwise air would collect at the side opposite to the inlet 1, and become compressed, thereby affecting the uniform flow of the milk. In the absence of the pipe 17, hollow spaces would be formed in the helical path of the casing 2 and 3, which would lead to a drying of the remainder of the milk and to interruptions in working.

By the provision of the central cylinders 6, which are also heated in consequence of the temperature prevailing in the interior of the casing 3, the effect is attained that on the one hand, the path along which the milk has to travel, is correspondingly extended, and on the other hand, a settling, storing up or accumulation of large quantities of milk is prevented.

Having now particularly described and ascertained the nature of my said invention that what I claim and wish to secure by Letters Patent is:—

In liquid heating apparatus, in combination, a helical shaped conduit through which the liquid to be heated is conveyed, said conduit being provided with an inlet at its upper end and an outlet at its lower end, an outer wall surrounding said conduit and forming a chamber adapted to contain the heating medium, a pipe within said chamber at the lower portion thereof and which is adapted to be connected to the source of supply of the heated medium, and a partition within said chamber between said conduit and said outer wall, said pipe being positioned between said partition and said conduit whereby the heated medium contained within the portion of the chamber between the conduit and the partition will be caused to move in an upward direction.

In testimony whereof I have signed my name to this specification in the presence of two subscribing witnesses.

JOSEF FLIEGEL.

Witnesses:
WOLDEMAR HAUPT,
HENRY HASPER.

---

Correction in Letters Patent No. 987,975.

It is hereby certified that in Letters Patent No. 987,975, granted March 28, 1911, upon the application of Josef Fliegel, of Mallmitz, Germany, for an improvement in "Apparatus for Heating Liquids, Especially Milk," an error appears requiring correction as follows: In the grant and in the printed heading the name of the assignee is erroneously written and printed "Georg Lindermann" whereas said name should have been written and printed *Georg Sindermann;* and that the said Letters Patent should be read with this correction therein that the same may conform to the record of the case in the Patent Office.

Signed and sealed this 6th day of June, A. D., 1911.

[SEAL.]

C. C. BILLINGS,
*Acting Commissioner of Patents.* minutes by the efficiency of the apparatus with respect to the sectional area of the helical path in the ribbed body 2. Thus, at least 5 minutes must elapse, before the milk, which enters below at 5 into the collecting chamber, can pass out at 9.

15 is a safety valve, which is so adjusted that it blows off even at low steam pressure, whereby the attendant is made aware of the fact that less steam must be introduced.

16 is a water-gage cock, above which the surface of the water should not rise before the apparatus is rendered operative. In consequence of its own expansion due to the influence of heating, the water then rises of itself in order to fill up the chamber above the cock.

17 is a ventilating pipe, which is necessary, because otherwise air would collect at the side opposite to the inlet 1, and become compressed, thereby affecting the uniform flow of the milk. In the absence of the pipe 17, hollow spaces would be formed in the helical path of the casing 2 and 3, which would lead to a drying of the remainder of the milk and to interruptions in working.

By the provision of the central cylinders 6, which are also heated in consequence of the temperature prevailing in the interior of the casing 3, the effect is attained that on the one hand, the path along which the milk has to travel, is correspondingly extended, and on the other hand, a settling, storing up or accumulation of large quantities of milk is prevented.

Having now particularly described and ascertained the nature of my said invention that what I claim and wish to secure by Letters Patent is:—

In liquid heating apparatus, in combination, a helical shaped conduit through which the liquid to be heated is conveyed, said conduit being provided with an inlet at its upper end and an outlet at its lower end, an outer wall surrounding said conduit and forming a chamber adapted to contain the heating medium, a pipe within said chamber at the lower portion thereof and which is adapted to be connected to the source of supply of the heated medium, and a partition within said chamber between said conduit and said outer wall, said pipe being positioned between said partition and said conduit whereby the heated medium contained within the portion of the chamber between the conduit and the partition will be caused to move in an upward direction.

In testimony whereof I have signed my name to this specification in the presence of two subscribing witnesses.

JOSEF FLIEGEL.

Witnesses:
 WOLDEMAR HAUPT,
 HENRY HASPER.

---

It is hereby certified that in Letters Patent No. 987,975, granted March 28, 1911, upon the application of Josef Fliegel, of Mallmitz, Germany, for an improvement in "Apparatus for Heating Liquids, Especially Milk," an error appears requiring correction as follows: In the grant and in the printed heading the name of the assignee is erroneously written and printed "Georg Lindermann" whereas said name should have been written and printed *Georg Sindermann;* and that the said Letters Patent should be read with this correction therein that the same may conform to the record of the case in the Patent Office.

Signed and sealed this 6th day of June, A. D., 1911.

[SEAL.]

C. C. BILLINGS,
*Acting Commissioner of Patents.*

Correction in Letters Patent No. 987,975.

It is hereby certified that in Letters Patent No. 987,975, granted March 28, 1911, upon the application of Josef Fliegel, of Mallmitz, Germany, for an improvement in "Apparatus for Heating Liquids, Especially Milk," an error appears requiring correction as follows: In the grant and in the printed heading the name of the assignee is erroneously written and printed "Georg Lindermann" whereas said name should have been written and printed *Georg Sindermann;* and that the said Letters Patent should be read with this correction therein that the same may conform to the record of the case in the Patent Office.

Signed and sealed this 6th day of June, A. D., 1911.

[SEAL.]

C. C. BILLINGS,
*Acting Commissioner of Patents.*